March 15, 1966   N. C. HEKIMIAN ETAL   3,240,953
SLICER CIRCUIT AND APPARATUS EMPLOYING SAME
Filed Dec. 13, 1962

INVENTORS
NORRIS C. HEKIMIAN
BY & NILS E. HVEDING

*Hurvitz & Rose*
ATTORNEYS 3,240,953
SLICER CIRCUIT AND APPARATUS
EMPLOYING SAME
Norris C. Hekimian, Kensington, and Nils E. Hveding, Silver Spring, Md., assignors to Page Communications Engineers, Inc., Washington, D.C., a corporation of Delaware
Filed Dec. 13, 1962, Ser. No. 244,458
5 Claims. (Cl. 307—88.5)

The present invention relates generally to a slicer circuit and to an amplitude probability density analyzer employing the slicer circuit. More particularly, the present invention relates to a slicer circuit providing a novel output characteristic and to a probability density analyzer utilizing the slicer circuit and particularly the novel output characteristic thereof, to provide an uncomplicated and economical analyzer having a high degree of accuracy.

Numerous slicer circuits are available in the art today and one type of circuit employs a pair of biased diodes which are rendered alternately conductive and non-conductive as the voltage to be sliced passes through the desired slicing region. Although the slicers of the prior art as described immediately hereinbefore are quite simple and inexpensive, the instruments are sensitive to supply voltage variations. Also, variation of the slice width or the slice level is not easily accomplished particularly where the slice width requires adjustment of both the upper and lower limits of the slice.

In accordance with the present invention, a slicer circuit is provided in which the upper and lower limits of the slice voltages are adjusted concurrently as a single function in a relatively simple and inexpensive circuit. The basic element of the slice circuit comprises a modified common-emitter transistor circuit having substantially equal value resistors or impedances in the emitter and collector circuits. As the voltage applied to the base electrode of the transistor is increased, the collector voltage falls along a curve having a slope of essentially, unity, until the transistor reaches saturation after which the transistor appears as a common node device in the circuit and the collector voltage rises with a slope of approximately unity so as to provide an output voltage characteristic of a V-shape having its vertex or apex at the saturation point of the transistor. Thus, the collector voltage of the transistor is the same for two different values of input voltage spaced equally above and below the saturation voltage.

The collector voltage of the transistor is coupled to a threshold detector forming the final element of the slicer circuit. The threshold of the detector, which may also constitute a transistor, determines both the upper and lower slice voltage limits since the detector determines the two equal voltage points on the collector voltage curve below which the detector does not conduct. The output voltage from the threshold detector may be a triangular voltage which is similar to the triangular portion of the output characteristic of the first-mentioned transistor in the slicer circuit. Alternatively, a switching device may be utilized in which as soon as the output voltage of the slicer transistor achieves the threshold level, the detector transistor goes into saturation to produce a square wave output signal.

An amplitude probability analyzer is employed to determine the relative length of time that the amplitude of a variable signal lies at a discrete amplitude level of its amplitude range. Mathematically, this can be stated as the limit of the relative time the wave form spends in an infinitely narrow amplitude range and is defined by the equation $$P(X) = \lim \frac{1}{T} \frac{\Delta t}{\Delta X} = \frac{1}{T} \frac{dt}{dx} \quad (1)$$
$$\Delta X \to 0$$
$$T \to \infty$$

Theoretically, the examination of a single function for an infinite time is an adequate method of determining the statistical properties of a stationary process. In a practical system, of course, an infinitely long interval may not be employed nor may an infinitely narrow voltage band be examined as required by Equation 1. However, accurate and highly useful information regarding the amplitude probability function of a signal may be achieved so long as the sliced band is small relative to the maximum amplitude of the function and the period of observation is sufficiently long compared with the lowest frequency component present so that the random variable may be considered as a stationary function.

In order to provide a measure of probability, the output voltage from the system must be normalized so that the total probability of the function is numerically equal to unity. In the present invention, no specific provision is made for normalization of the voltage output signals obtained, since the device is primarily designed for comparison of various functions to determine relative probabilities rather than time probabilities. For any particular function analysis, the instrument may be calibrated against the maximum obtainable voltage to obtain a scale factor for normalizing the voltage readings. Alternatively, the slice width may be chosen in a specific instance to effect normalization of the output voltage. In those instances where external display is employed, for instance, in a cathode ray oscilloscope, the gain controls of the external display equipment may be employed to normalize the readings.

Probability density functions are well known in those fields in which statistical techniques are employed and have numerous fields of applicability. The analyzers may be utilized to measure the random amplitude distribution of noise from a transducer, to measure the noise of various demodulator circuits, to analyze the rise time of square waves, to measure the distortion in audio and other types of amplifiers and similar analyses.

The amplitude probability density analyzer of the present invention utilizes the aforesaid slicer circuit as the element thereof which selects the particular amplitude range to be analyzed at any given time. Normally, the slicer circuit of an amplitude probability density analyzer is required to produce a square wave output voltage so that the analysis is independent of the amplitude of the signal within the range being analyzed. However, the triangular output wave form of the slicer circuit may be employed without modification in the probability analyzer of the present invention.

The area of a triangle is equal to one-half the area of a rectangle having the same base. The functions to be analyzed by the probability density analyzer of the invention are random variables so that the distribution of the amplitudes within the slice range, on a statistical basis, is substantially uniform and the integrated area under the curve is then approximately one-half of that which would be obtained if a square wave output signal were derived from the slicer circuit. There are certain advantages to this type of arrangement since in a transistor driven into saturation to provide a square wave output signal, there is normally a dimple in the top of the wave which introduces as much, if not more, inaccuracy into the measurement than the inaccuracies introduced by the fact that the random variable does not have a completely equal distribution throughout the slice level. Of course, the square wave technique can be employed in the present invention but it is not felt that any real advantage is achieved.

An additional advantage deriving from utilizing the slice circuit of the present invention in a probability density analyzer is that since the slice width may be readily controlled by controlling the threshold level of the analyzer transistor stage, the width of the individual slices may be controlled to permit a great deal of flexibility in the analysis procedures employed. Also, since a single transistor element is employed to determine the slice width, variations in the supply voltage do not appreciably effect the slice width but merely shift the slice position relative to the maximum input amplitude.

The analyzer is simple in construction constituting as a basic element the aforementioned slicer circuit which utilizes transistors and in the specific embodiment illustrated employs two further transistors as amplifiers. The remainder of the circuit is primarily made up of resistors and capacitors and an internal meter circuit which may be eliminated if external display only is desired.

It is therefore an object of the present invention to provide a slicer circuit in which a single control is provided for determining the slice width.

It is another object of the present invention to provide a slicer circuit employing a single transistor as the active element of the circuit.

Another object of the present invention is to employ the triangular collector electrode characteristic curve of a transistor, generated when a transistor employing nominally equal values emitter and collector impedances is driven through saturation, to provide a voltage slicing function in a slicer circuit.

It is another object of the present invention to provide a voltage slicer circuit which is relatively insensitive to supply voltage variations and in which the slice level and slice width are independently controlled and in which the upper and lower limits of the slice width are controlled by a single adjustment and in which they are varied by equal amounts relative to the center voltage of the slice width.

Yet another object of the present invention is to provide an amplitude probability density analyzer employing a slicer circuit providing a triangular voltage output voltage characteristic over the signal range of each slice width.

It is still another object of the present invention to provide an uncomplicated yet highly accurate amplitude probability analyzer employing the novel slicer circuit of the invention.

The above and still further objects, features and advantages of the present invention will become apparent upon consideration of the following detailed description of one specific embodiment thereof, especially when taken in conjunction with the accompanying drawings, wherein.

Figure 1:
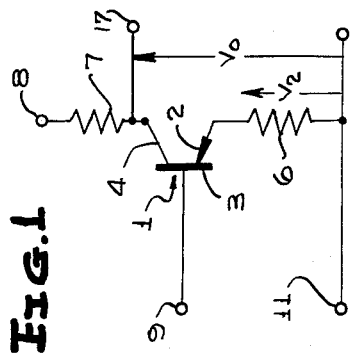
FIGURE 1 is a schematic circuit diagram of a transistor circuit employed in the slicer circuit of the present invention.

Referring now specifically to FIGURE 1 of the accompanying drawing, there is illustrated the novel slicer circuit of the present invention. The slicer circuit comprises a PNP transistor 1 having an emitter electrode 2, a base electrode 3 and a collector electrode 4. The emitter electrode 2 is connected through a resistor 6 to a source of reference potential which may be, though is not necessarily, ground potential, the reference potential is hereinafter referred to as ground. The collector electrode 4 is connected through a resistor 7 to a terminal 8 adapted to be connected to a source of negative operating potential for the transistor 1. The base electrode 3 of the transistor 1 is connected to a first input terminal 9, a second input terminal 11 being connected to ground.

The equation for the voltage at the collector 4 upon the application of an input signal between terminals 9 and 11 is $$V_0 = -\alpha V_2 \frac{R_c}{R_e} \left( \frac{I_c}{I_0} = \alpha \right) \qquad (2)$$

where $\alpha$ is the gain of a stage. In the particular application to which the circuit is to be applied, the term $\alpha$ is as close to unity as possible. The slope of the input-output characteristic at the collector is determined by the ratio of the resistors $R_c$ and $R_e$ which in the diagram of FIGURE 1 are the resistors 7 and 6, respectively. These values of $R_c$ and $R_e$ are chosen to be equal so that the ratio of $R_c/R_e$ is one. Therefore, in Equation 2 with $\alpha$ and the resistance ratio both practically equal to unity, Equation 2 becomes Equation 3 which is $$V_0 = -V_2 \qquad (3)$$

where $V_0$ is the collector voltage and $V_2$ is the emitter voltage.

Figure 2:
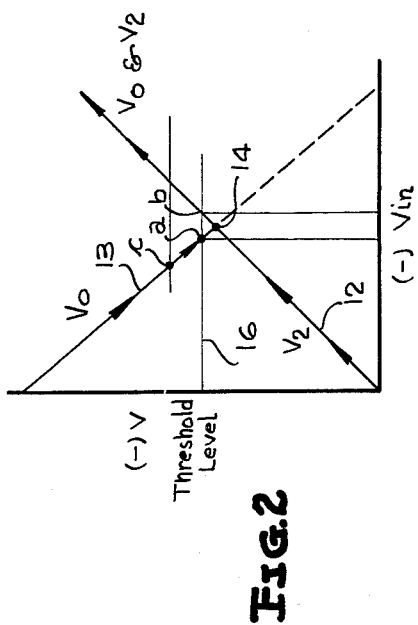
FIGURE 2 is a graph of the output voltage characteristic versus input voltage of the circuit of FIGURE 1.

Referring now specifically to the curve of FIGURE 2, the collector and emitter voltages, are plotted against negative input voltage as the abscissa. Since the gain of the unit is approximately unity, and $R_c$ and $R_e$ are equal, the slope of the emitter and collector voltages are nearly unity.

As the input voltage is increased, (becomes more negative) the emitter voltage increases, becoming more negative and is substantially equal to the input voltage, differing therefrom only by the low forward emitter-base voltage drop. The collector voltage decreases in value from the value of the negative supply. At saturation at the transistor, which occurs at the point 14 in the curve, the collector voltage is approximately equal to the base and emitter voltages differing from the emitter voltage by the very small saturation voltage, about 50 millivolts for a germanium transistor.

As input voltage continues to increase; that is, becomes more negative in this context, it is impossible for the transistor to drive the collector-base voltage beyond the emitter-base voltage and therefore all three terminals of the transistor are constrained to follow the input voltage very closely. The transistor now behaves as if it were a single node having neither current nor power gain. The slope of the output voltage beyond the saturation point then is a curve having a unity positive slope. The output characteristic of the transistor 1 is seen to be of a V-shape with the vertex of the "V" occurring at the saturation point of the transistor.

Slicer action may be achieved by employing with the circuit of FIGURE 1 a threshold detector circuit which has a threshold level, for instance, as illustrated by a horizontal line 16 in FIGURE 2. If the detector has a threshold lying along the line 16, then the output voltage at the collector 4 which, may be taken from the terminal 17 of FIGURE 1, is below (more negative than) the conduction level of the threshold detector until it reaches the point "a" at the intersection of the collector voltage curve $V_0$ and the threshold level, line 16. At this point, the detector becomes conductive, indicating that the input voltage has risen above a particular value. Further increases in the input voltage causes the output characteristic to reach the vertex 14 and thereafter the collector voltage reverses its slope and is finally brought to a point "b" representing a second intersection of the collector voltage curve and threshold level line 16. Continued rise of the input voltage; that is, as the input voltage becomes increasingly negative, causes the voltage to pass the threshold level of the detector so that thereafter the detector does not conduct. Thus, a slice is taken out of the input voltage, the slice width being determined by the difference in voltage between the threshold level of the detector and the apex 14 of the output characteristic curve of the circuit of FIGURE 1. The threshold level may be adjusted to control the width of the slice by a simple bias adjustment technique on the threshold detector as will be explained subsequently.

Thus, in accordance with a first feature of the present invention, there is provided a slicer circuit employing a single transistor and two matched resistors. It should be noted that, although the circuit of the present invention is illustrated as employing a PNP transistor and therefore is intended to be utilized with negative input voltages, if positive input voltages are contemplated an NPN transistor may be utilized. The circuit has the same output characteristic curve in response to positively rising input voltages as the circuit illustrated in FIGURE 1 has to negatively increasing input voltages. The only critical parameters in the circuit are the values of the resistors 6 and 7, although the collector leakage current does become an important consideration of the circuit when utilized in the probability density detector of the present invention. This factor, however, will be discussed subsequently.

Figure 3:
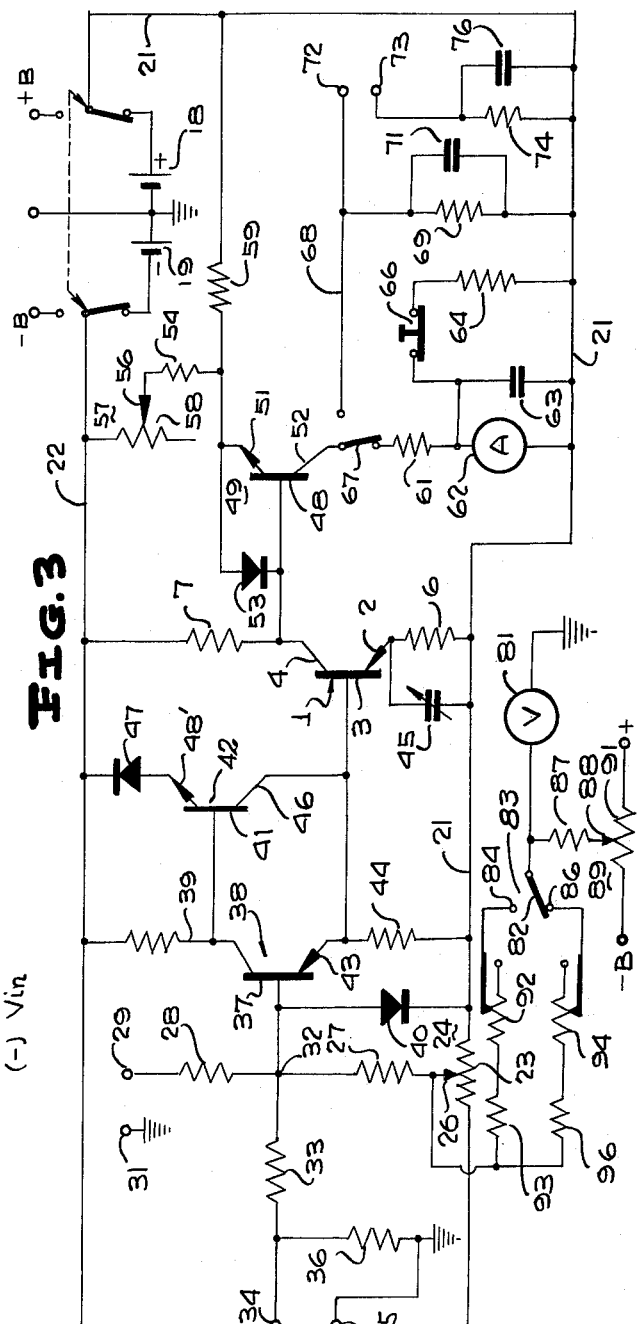
FIGURE 3 is a schematic circuit diagram of relative amplitude probability density analyzer of the present invention employing the transistor circuit of FIGURE 1.

Referring now specifically to FIGURE 3 of the accompanying drawing, there is illustrated the probability density detector of the present invention, utilizing the novel slicer circuit hereof. The reference numerals of FIGURE 1 relating to the slicer circuit are employed in FIGURE 3 to designate the corresponding circuit elements in this latter figure. The apparatus may be provided with internal power supplies and is illustrated as employing a first battery 18 and a second battery 19 having their negative and positive plates respectively joined together and connected to ground. Switches are provided for connection of external supplies which may be batteries or rectifier supplies as may be the internal supplies. From the point of view of design convenience, the voltage supplies are of equal voltage values although this is of no import so far as the basic invention is concerned. The positive terminal battery 18 is connected to a positive voltage bus 21 from which may be derived the various positive operating voltages of the circuit. The negative terminal of the battery 19 is connected to a negative voltage bus 22 from which may be derived the various negative operating voltages for the system. A resistor 23 forming the resistive element of a slice level control potentiometer 24 is connected between the voltage busses 21 and 22 and since the batteries 18 and 19 in this particular instance are of equal voltage output values, the middle resistance point of the resistor 23 is normally at ground potential. The potentiometer 24 includes a slider 26 which may be moved over the resistor 23, the slider 26 being connected via resistors 27 and 28, connected in series, to a terminal 29. There is provided a further terminal 31 which is normally connected to ground, the terminals 29 and 31 having a sweep input voltage connected thereacross. The sweep input voltage is employed to scan the amplitude spectrum of the input signal as will be described more fully subsequently.

A junction 32 of resistors 27 and 28 is connected through a further resistance 33 to an input terminal 34. The terminal 34 is connected through an input resistor 36 to ground and the voltage whose amplitude probability is to be analyzed is applied between the terminal 34 and grounded input terminal 35. The junction 32 is further connected to a base electrode 37 of a transistor 38 of a first amplifier stage. A diode 40 is connected between the base electrode 37 and ground to provide reverse current protection. The transistor 38 has its collector 39 connected through a collector resistor 40 to the negative bus 22 and directly to a base electrode 41 of an NPN transistor 42 of a second amplifier.

The transistors 38 and 42 constitute a cascaded buffer amplifier employed to provide a low driving impedance for the slicer circuit employing the transistor 1 and further provides a constant input impedance over a wide range of D.C. levels of the input signal. This is accomplished by employing degeneration in the first stage of the amplifier and by providing further degeneration by negative feedback between the two stages of the amplifier. More specifically, the transistor 38 includes an emitter 43 connected to the positive bus 21 through an emitter resistor 44 which provides for degenerative feedback in this circuit. The transistor 42 includes a collector 46 connected to the emitter 43 of the transistor 38 and an emitter electrode 48″ connected through a bias diode 47 to the negative voltage bus 22. The diode 47 provides a constant D.C. voltage to the emitter 48″. The feedback from the collector 46 of the transistor 42 to the emitter 43 of the transistor 38 is also degenerative. The overall effect of the circuit is to cause the transistor 38 to have such a high input impedance that the input impedance to the circuit, so far as the input signal is concerned, appears to be the impedance of the resistors 33 and 27 only. These resistors provide a fixed value of input impedance which is insensitive to both frequency and amplitude.

It will be noted that the emitter 43 of the transistor 38 is connected to the base electrode 3 of the transistor 1 to provide as an input signal thereto, the signal being developed across the emitter resistor 44 of the transistor 38. The emitter resistor 44 has a low impedance of the order of magnitude of 1000 ohms and presents a low driving impedance to the slicer circuit. The emitter resistor 6 of transistor 1 is shunted by a variable capacitor 45 which serves as a frequency response control. The capacitor 45 provides an emitter peaking circuit which maintains the gain of transistor 1 flat over a wide frequency range.

The output voltage from the transistor 1 appears at the collector 4 and is applied to a base electrode 48 of a threshold detector transistor 49 having an emitter 51 and a collector 52. The emitter 51 is connected through a diode 53 to the base 48, the diode 53 providing reverse current protection for the transistor 49. The emitter electrode 51 is also connected through a resistor 54 to a slider 56 of a potentiometer 57 having a resistor 58. One end of the resistor 58 is unconnected and the other end is connected to the negative voltage bus 22. Emitter electrode 51 of the transistor 49 is also connected through a resistor 59 to the positive voltage bus 21. The resistors 54, 58 and 59 constitute a variable voltage divider connected across the battery supplies 18 and 19. The potentiometer 57 is employed to adjust the bias on the emitter 51 of the transistor 49 so as to determine the width of the slice examined by the circuit as will be more fully explained subsequently.

The collector electrode 52 of the transistor 49 is connected through a two position switch 67 and then through a resistor 61 to one terminal of an ammeter 62, the other terminal of which is connected to the positive volt bus 21. An integrating capacitor 63 is connected across the ammeter 62 which is also normally shunted by a resistor 64 serving to provide over current protection for the meter. The resistor 64 may be removed from the circuit by means of a push button switch 66. It is desired to remove the resistor 64 from the circuit during the reading of the meter 62 in order to increase the sensitivity of the circuit. The capacitor 63 is chosen such that the integrating interval is longer than the period of the lowest frequency component expected to be encountered. The value of the capacitor therefore is a function of the nature of signal to be analyzed.

The value of the resistor 61 determines the operating characteristics of the transistor 49 either as a Class B amplifier or as a switch. In the former case, the output signal of the transistor is a linear function of the input voltage and in the latter case, the output voltage wave form of the transistor 49 is a square wave. Either type of operation may be employed as previously indicated.

The switch 67 when thrown to its alternative position connects the collector 52 of transistor 49 to an external display lead 68. The lead 68 is connected through a resistor 69 to the positive voltage bus 21 and is shunted by an integrating capacitor 71. The lead 68 is connected to an output terminal 72. A second output terminal is connected to the voltage bus 21 via parallel arranged resistor 74 and capacitor 76. The terminal 73 is not grounded and the resistor 74 serves to prevent short circuiting of the battery 18 as a result of inadvertent grounding of the terminal 73.

As previously indicated, the potentiometer 24 determines the slice level of the system whereas the potentiometer 57 determines the slice width. The slider 26 of the potentiometer 24 by its position determines the no signal voltage applied to the base 37 of the transistor 38 and therefore determines the no signal voltage applied to the base electrode 3 of the transistor 1 thereby selecting the point of operation of the transistor 1 on its characteristic curve, as illustrated in FIGURE 2, in the absence of an input signal. The potentiometer 57 on the other hand determines the point at which the transistor 49 conducts relative to the apex 14 of the curve of FIGURE 2; that is, the saturation point of the transistor 49. If, for instance, the threshold level is set as indicated, in FIGURE 2 and the slice level is set by the potentiometer 24 such that the transistor 1 is operating at the point "a" on its characteristic curve, then no current flows through the transistor 49 in the absence of an input signal. However, upon a negative input signal being applied, the transistor 49 conducts over an input voltage range as determined by the points "a" and "b" in FIGURE 2. If, now, the potentiometer 24 is adjusted such that the transistor 1 is operating at a point "c" in FIGURE 2 of its characteristic curve in the absence of an input signal, an input signal of a magnitude "c" to "a" must be applied across the input resistor 36 before current flows through the transistor 49. Thus, the potentiometer 24 determines the amplitude of the input signal required to produce conduction of the transistor 49 and determines the slice level. The potentiometer 57 determines the input voltage to the base electrode 48 of the transistor 49 required to cause this transistor to conduct and therefore determines the amplitude range over which the transistor 49 conducts, and determines the width of the slice or, more particularly, the horizontal width of the "a" to "b" points in the curve of FIGURE 2.

The resistor 27 is employed as a summing resistor in a shunt injection circuit. More particularly, a positive going sweep (ramp) voltage is adapted to be applied across the terminals 29 and 31 while the input signal is applied across the resistor 36. If the slice level as initially determined by the potentiometer 24 is for instance set at the point "a" of FIGURE 2 then the analysis of the input signal is effected by adding to the bias voltage a positively increasing ramp voltage which causes the transistor 1 to follow the left leg of its V-shaped characteristic so that its output voltage is increasingly removed from the threshold level of the transistor 49. Therefore, it takes an increasing amplitude of input signal to cause the transistor 1 to retreat along its curve toward the point a. In this way, the slicer circuit is effectively scanned through the entire amplitude range to be analyzed. When it is desired to provide external display, for instance, on an oscilloscope, the sweep input voltage to the terminals 29 and 31 may also be applied to the horizontal deflection circuit of a cathode ray tube so that the scanned output from the circuit appearing across terminals 72 and 73 is displayed against amplitude of input signal as the abscissa and the probability densities at any particular amplitude are displayed as the output function or ordinate of the trace.

As previously indicated manual control of the instrument with internal display or external display may be employed. It is necessary to first set the level control so that the transistor 1 is operating at the apex 14 of its characteristic curve. This may be done by opening up the slice width to encompass a major portion of the amplitude range, the resistor 64 providing protection of the meter 62. The level control 26 is moved toward the middle of its range, thus producing a reading on the meter 62. The slice width is reduced and the slider 26 manipulated to maintain a reading on meter 62. This process is repeated until the slice width is nearly zero; that is, just bracketing the apex 14. A reading on the meter 62 indicates that the input voltage lies within the slice width, which is at the apex 14 of the curve. The slice width may now be opened to the desired width for measurement. In the adjustment described the input signal is chosen as zero voltage. Other precisely known voltages may be employed for this initial calibration step, zero voltage being one example of such a voltage and being easily achieved.

The setting of the level control 26 is measured by a meter circuit including a level meter 81. One terminal of the meter 81 is grounded and the other terminal is connected to a movable contact 82 of a switch 83 having stationary contacts 84 and 86. The movable contact 82 is also connected through a resistor 87 to a slider 88 of a potentiometer 89 having a resistor 91 connected between the positive and negative buses 21 and 22. The stationary contact 84 is connected via variable resistor 92 and fixed resistor 93, in series, to the slide 26 of potentiometer 24. The stationary contact 86 is connected via variable resistor 94 and fixed resistor 96, in series, also to the slide 26. The switch 83 and resistors 92, 93, 94 and 96 provide for range switching so that two different ranges of the slice level may be monitored.

In operation, after initial setting of slice width, slice level and meter reading contacts 67, the slider 88 is adjusted so that the level meter 81 reads zero indicating that zero voltage is applied to the input terminals 34 and 35. It will be noted that the meter 81 is intended to indicate the voltage at the input circuit, which voltage has a 4 to 1 ratio to the voltage at the slider 26; this being determined by the voltage divider 33 and 27. If the ratio is not correct, adjustment is effected by one or the other of the resistors 92 or 94. An input signal may now be applied to the terminals 34 and 35 and the reading on meter 62 recorded. The level control 26 is manipulated to select a new level which is again read on the level meter 81. The push button switch 66 is depressed and the meter reading recorded. The slice level is increased or decreased again and the meter again read. This procedure is repeated until the entire or the desired portion or portions of the amplitude range of the input signal has or have been examined.

The values read from the meter may now be plotted as ordinates against the level meter readings as abscissas to provide a relative probability density versus voltage level curve. The ordinate values may be normalized by choosing a plotting scale such that the area under the surve is unity.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. A variable-width, variable-amplitude slicer circuit including a threshold detector and a transistor circuit having a triangular output-versus-input voltage characteristic symmetrical about a vertex occurring at saturation of said transistor, said transistor circuit having base, emitter and collector electrodes, substantially equal impedances connected in series with each of said emitter and collector electrodes, means for connecting a source of voltage in series with said emitter and collector electrodes and said impedances, means connecting said collector electrode to said threshold detector to couple the signal on said collector electrode to the threshold detector, means for applying an input signal to said base electrode, means connected to said base electrode for applying a bias voltage to the base electrode of said transistor, said means for biasing having means for at will varying said bias voltage to vary the position of the vertex of said triangular output characteristic relative to the magnitude of the input voltage and means for at will adjusting the level of initiation of conduction of said threshold detector to vary the range of conduction of said threshold detector relative to the vertex of said characteristic thereby to vary the width of the voltage slice over which said detector is conductive.

2. The combination according to claim 1 wherein said threshold detector includes a signal output circuit, and means connected to said signal output circuit for integrating signals appearing in said signal output circuit over a period greater than the period of the lowest frequency component of the input signal.

3. The combination according to claim 1 wherein said means for biasing said threshold detector provides a bias such that said detector is conductive over a range which is small compared with the expected voltage range of the input signal.

4. The combination according to claim 1 wherein said means connected to said base electrode for applying a bias voltage to the base electrode of said transistor includes means for applying a ramp voltage to said base electrode so as to sweep the voltage slice passed by said slicer circuit over the amplitude range of the input signal.

5. The combination according to claim 1 wherein said threshold detector includes a proportional amplifier such that said output current of said threshold detector is a linear function of the voltage applied thereto.

References Cited by the Examiner
UNITED STATES PATENTS

| | | | |
|---|---|---|---|
| 2,890,352 | 6/1959 | Goodrich | 307—88.5 |
| 3,098,936 | 7/1963 | Isabeau | 307—88.5 |

ARTHUR GAUSS, *Primary Examiner.*